US008571327B2

(12) United States Patent
Sacher et al.

(10) Patent No.: US 8,571,327 B2
(45) Date of Patent: Oct. 29, 2013

(54) METHOD FOR CONTROLLING THE QUALITY OF PRINTED DOCUMENTS BASED ON PATTERN MATCHING

(75) Inventors: Jörn Sacher, Hiddenhausen (DE); Bernd Stöber, Rheda-Wiedenbrück (DE); Harald Willeke, Paderborn (DE); Volker Lohweg, Bielfeld (DE); Thomas Türke, Lonay (CH)

(73) Assignee: KBA-NotaSys SA, Lausanne (CH)

( * ) Notice: Subject to any disclaimer, the term of this patent is extended or adjusted under 35 U.S.C. 154(b) by 628 days.

(21) Appl. No.: 12/310,702

(22) PCT Filed: Sep. 3, 2007

(86) PCT No.: PCT/IB2007/053535
§ 371 (c)(1), (2), (4) Date: Mar. 30, 2010

(87) PCT Pub. No.: WO2008/029340
PCT Pub. Date: Mar. 13, 2008

(65) Prior Publication Data

US 2010/0189311 A1 Jul. 29, 2010

(30) Foreign Application Priority Data

Sep. 6, 2006 (EP) .................................... 06120198

(51) Int. Cl.
*G06K 9/62* (2006.01)

(52) U.S. Cl.
USPC ............................ 382/209; 382/112; 382/100

(58) Field of Classification Search
USPC ......................................... 382/209, 112, 100
See application file for complete search history.

(56) References Cited

U.S. PATENT DOCUMENTS 3,412,993 A 11/1968 Giori
5,317,390 A 5/1994 Bolza-Schunemann et al.

(Continued)

FOREIGN PATENT DOCUMENTS

CA 2171891 10/1996
CA 2173675 10/1996

(Continued)

OTHER PUBLICATIONS

Turke, Thomas, Lohweg, Volker; A Real-Time Image-Processing-System-On-Chip for Security Feature Detection and Classification; Real-Time Imaging VIII, SPIE vol. 5297, 2004.

(Continued)

*Primary Examiner* — Ruiping Li
(74) *Attorney, Agent, or Firm* — Krieg DeVault LLP; Clifford W. Browning

(57) ABSTRACT

A method for controlling the quality of printed documents, such as banknotes, in which only part of the surface of the printed documents is available for inspection, comprising the steps of (i) storing a reference image; (ii) acquiring a sample image of a sample printed document to be controlled, which sample image covers only a limited portion of the sample printed document; (iii) selecting a search pattern within the acquired sample image; (iv) searching the reference image for a match with the selected search pattern, (v) determining control parameters linked to the position of the search pattern within said sample image and within said reference image, (vi) comparing the control parameters linked to the position of the search pattern within the sample image with the control parameters linked to the position of the search pattern within the reference image; and (vii) based on the results of the comparison of the control parameters, accepting or rejecting the sample printed document.

14 Claims, 4 Drawing Sheets

(56) References Cited

U.S. PATENT DOCUMENTS

| | | | | |
|---|---|---|---|---|
| 5,384,859 | A | 1/1995 | Bolza-Schunemann et al. | |
| 5,592,573 | A | 1/1997 | Eisenbarth et al. | |
| 5,778,088 | A | 7/1998 | Stringa | |
| 6,665,424 | B1 | 12/2003 | Stringa | |
| 6,768,104 | B1 | 7/2004 | Sauer et al. | |
| 6,952,484 | B1 * | 10/2005 | Higginbottom et al. ...... | 382/100 |
| 2003/0194136 | A1 | 10/2003 | Fujii et al. | |

FOREIGN PATENT DOCUMENTS

| | | | |
|---|---|---|---|
| EP | A 382 549 | A2 | 9/1990 |
| EP | 0 527 285 | A2 | 2/1993 |
| EP | 0 540 833 | A2 | 5/1993 |
| EP | 0 582 548 | A1 | 2/1994 |
| EP | 0 730 959 | A1 | 9/1996 |
| EP | 0 734 863 | | 10/1996 |
| EP | 0 737 936 | A1 | 10/1996 |
| EP | 0 985 531 | A1 | 3/2000 |
| WO | WO 01/14111 | A1 | 3/2001 |

OTHER PUBLICATIONS

Lohweg, Volker, Diederichs, Carsten, Muller, Dietmar; Algorithms for Hardware-Based Pattern Recognition; EURASIP Journal on Applied Signal Processing, Dec. 2004, 1912-1920.

Lohweg, Volker, Diederichs, Carsten, Muller, Dietmar; An Image-Processing-System-on-Chip Based on NonLinear Generalized Circular Transforms and Fuzzy Pattern Classification; KBA-Bielefeld, Westring 31, D-33818, Leopoldshohe, Germany, Technische Universitat Chemnitz, D-09107 Chemnitz, Germany.

Jahne, Bernd; Digital Image Processing; Interdisciplinary Center for Scientific Computing; 5th Revised Extended Edition, 2002.

Gonsalez/Woods, Addison Wesley, Decision-Theoretic Methods p. 583 (ISBN 0-201-50803-6).

Bocklisch, S.F., Priber, U.; A Parametric Fuzzy Classification Concept; Proceedings of the International Workshop on Fuzzy Sets Applications, pp. 147-156, Mar. 3-8, 1985.

Ahmed, Nasir, Rao, K.R., Abdussattar, A.L.; BIFORE or Hadamard Transform, IEEE Transactions on Audio and Electroacoustic, vol. AU-19, pp. 225-234, 1971.

* cited by examiner

METHOD FOR CONTROLLING THE QUALITY OF PRINTED DOCUMENTS BASED ON PATTERN MATCHING

This application claims the benefits under 35 U.S.C. 119 (a)-(d) or (b), or 365(b) of International Application No. PCT/IB2007/053535 filed 3 Sep. 2007, and European Patent Application No. 06120198.4 filed 6 Sep. 2006.

TECHNICAL FIELD

The present invention generally relates to a method for controlling the quality of printed documents based on pattern matching technique, especially for controlling the quality of banknotes and security documents such as passports, ID documents, checks, etc.

BACKGROUND OF THE INVENTION

It is well known in the art to control the quality of the printing of banknotes and other similar documents.

In the prior art, when checking the printing quality on paper and especially the printing quality of paper securities, electronic automatic inspection means are used which comprise one or more black-and-white or color cameras to capture the images to be inspected. These images consist of matrices, usually rectangular matrices, comprising pixel values which are representative of the quantity of light reflected by the inspected material (in reflective inspection where one side of the inspected material is checked) or transmitted through the inspected material (in transparency inspection where the transmission properties of the inspected material are checked). In other words, the image is subdivided into a plurality of pixels each having a densitometric value representative of the light reflected or transmitted by a corresponding local region of the inspected material. The number of pixels relating to an image is a function of the resolution of the camera. In a monochrome (black and white) system, the image is described by a single matrix, while in polychrome systems the image is usually described by as many matrices as there are chromatic channels used. Normally, for the RGB (Red, Green, Blue) type, three chromatic channels are used. The procedures used to carry out this type of automatic check are based on the following schemes:

From a set of sheets regarded as being acceptable, a model of acceptable printing quality is constructed. Various techniques are used to construct this model. For example, from the set of sheets regarded as being acceptable, an average image is calculated, that is to say an image which is described by a matrix in which each pixel is associated with the average value obtained in the set of test sheets.

Another procedure associates each pixel with two values, one is the minimum values which has been attained in the set of test sheets and the other is the maximum values. Thus, for each image, two matrices are used, one with the minimum value and the other with the maximum value. Of course, if the image is a polychrome image, two matrices per colour channel are obtained.

The above procedures are in particular disclosed in European patent applications EP 0 527 285 and EP 0 540 833 (corresponding to U.S. Pat. No. 5,317,390 and U.S. Pat. No. 5,384,859).

When producing the images to be inspected, each pixel of the image to be inspected is compared with the pixel of the model thus obtained. If the difference exceeds a predetermined threshold value or if it lies outside the minimum-to-maximum range, the pixel is regarded as having a printing defect. In the end, the total number of defective pixels determines whether or not the image will be rejected.

More precisely, according to U.S. Pat. No. 5,317,390, the procedure for judging the quality of a printed image printed on a printing carrier comprises: dividing a printed image to be judged into a multiplicity of image pixel elements of a preselected size; determining a nominal ink density value for each of said image pixel elements and storing such nominal ink density values in a reference image storing device; determining from a multiplicity of printed proof images judged to be acceptable the actual proof ink density values for each of said image pixel elements: obtaining from said actual values a maximal acceptable ink density value (FD MAX) and a minimal acceptable ink density value (FD MIN) for each of said image pixel elements to provide an ink density tolerance range for each said image pixel elements; allocating to said stored nominal ink density value for each of said image pixel elements an error tolerance range corresponding to the maximal and minimal acceptable ink density values FD MAX and FD MIN; measuring the actual ink density value for each image pixel element for a printed image to be judged; and comparing said measured ink density values for each image pixel element to said stored nominal ink density value and error tolerance range to determine the quality of the printed image to be judged.

According to U.S. Pat. No. 5,384,859, the process for quality control of an image, comprises: defining within a printed image to be inspected a plurality of individual image elements, each element encompassing an image pattern; storing a master printed image incorporating said plurality of individual image elements, the stored master image including for each image element a stored nominal pattern value; storing an acceptable tolerance range for each image element nominal pattern value to provide minimum and maximum allowable pattern values for each said image element; measuring individual image elements of a printed image to obtain individual measured pattern values; and comparing said individual measured pattern values with corresponding allowable maximum and minimum stored pattern values to determine errors in said printed image.

When producing certain types of valuable prints, such as securities, banknotes, stamps, etc., the images are printed using various printing techniques, such as offset, intaglio, etc. These various types of printing techniques constitute as many printing phases. In a normal printing process, the paper firstly passes through a printing system for the first phase and a first drawing is printed, and then the paper passes through a second printing system for the second printing phase enabling a second drawing to be printed on the paper. In this case, apart from the problem of printing quality, there is also the problem of printing the drawings of the different phases into a proper relative register. The reason for this is that deviations may exist between two images printed in this way in the case of drawings which are printed in different phases. These deviations, which may amount to a few pixels, may be either in the direction of movement of the paper or in a direction perpendicular. In this case, it is hardly possible to extract a model which represents the desired printing quality by using the techniques mentioned above since greatly varying values may be associated with the same pixel owing to misalignment or defective registration between the printing phases.

In this case, it has been proposed to construct a model for each printing phase. To do this, sets of sheets printed only with one of each of the printing phases are included in the set of test sheets. Using a procedure similar to the procedure described above, a model is constructed for each printing phase. During the phase of preparing these models, the operator identifies the portions of the image which comprise only or essentially only a single printing phase.

In production, firstly the relative misalignments between the printing phases are measured by using the pixels identified during the preparation of the models.

Next, the models are combined, taking into account the way in which the various phases are successively printed on the sheets in order to obtain a single reference model whose disposition corresponds to the disposition of the drawings in the images to be checked. Next, each image is compared with the model thus produced. This known procedure is complicated and particularly expensive for the printer, since for each production batch it is necessary to print as many sets of sheets representative of the desired printing quality as there are printing phases.

Other known methods are disclosed for example in EP 0 730 959 (corresponding to U.S. Pat. No. 5,778,088), EP 0 734 863 and EP 0 985 531 (corresponding to U.S. Pat. No. 6,665, 424). EP 0 730 959 discloses a procedure for producing a reference model by electronic means, intended to be used for automatically checking the printing quality of an image on paper, especially for paper securities, said image being composed of drawings printed in at least two separate printing phases, which procedure comprises the following steps:

a. a set of images (test sheets), which are completely printed by means and procedures used for long print runs, is prepared;

b. said images are arranged so that the drawings of said images printed in a first phase are in register;

c. while the images remain in register they are recorded and the densitometric values of pixels constituting said images are stored in a memory;

d. the minimum value obtained from all the images of the set for each pixel location of the images of the set is associated with each pixel of a first printing phase model and the model of the drawing printed in said first printing phase is thus formed;

e. thereafter, the images are arranged so that the drawings printed in another printing phase are put into register and steps c. and d. are repeated for all the drawings printed in the separate printing phases; and f. the models thus obtained are recombined in order to form the reference model of the final produced image on paper to be checked, each individual test sheet undergoes the same type and number of printing phases as the final produced image on paper to be checked.

Then the quality control of printed sheets is carried out by comparison of the obtained sheets with the reference model for example by comparing each pixel value obtained from a printed sheet with the corresponding pixel value of a reference image. If the pixel values obtained are within predetermined ranges of pixel values of the reference image, the controlled sheet is accepted, if not the sheet is rejected.

Another example of a control method is disclosed in EP 0 734 863. In this publication, the control process involves passing sheets of paper carrying printed images in front of a camera which inspects them and passes the captured image to a unit which is capable of measuring the misalignment. The measured value of misalignment is sent to a memory which contains all the pixel models which have acceptable misalignment and the model matching the measured value most closely is chosen and transmitted to a comparator. The comparator compares subsequent images captured by the camera with the selected pixel model thus establishing an automatic image control.

A further example of a process for producing by electronic means a model for automatically inspecting the print quality on deformable objects is given in EP 0 985 531. The model is firstly produced by capturing with an electronic camera (CCD for example) the images of a set of sheets whose print quality is regarded as acceptable; the images are stored so as to produce a first reference image, together with the relevant densitometric tolerance limits. This reference image is thereafter divided into a multitude of sub-images by superimposing a grid with very small mesh cells. During inspection, the distances between the nodes of the grid are measured on the image to be inspected: this therefore produces an elastic modification of the model, which is such as to make the distances between the nodes the same as in the image to be inspected. The image to be inspected is thus verified with respect to the modified reference (model) by using any of the standard inspection techniques.

Yet another example of a method and apparatus for controlling printing quality of banknotes during their production is disclosed in European patent application EP 0 582 548 A1. This document discloses an image processing apparatus including a data acquisition stage for acquiring data representative of several spatially separated regions of a sample. The apparatus also includes data storage means for storing reference data corresponding to the sample data, namely an image of a reference sheet. The two sets of data are compiled and analysed to determine if the sample is shifted from a nominal position.

Another type of control that is carried out on printed matter such as banknotes is described in U.S. Pat. No. 3,412,993: after printing, banknotes are inspected photoelectrically to determine whether the printing is correctly centred upon the note. An operator initially marks any imperfectly coloured banknotes whilst still in a sheet and after subsequent cutting, stacking and counting, the individual banknotes pass by means of rollers or a conveyer belt in front of two detecting systems each inspecting both sides of the banknote. A first detecting system senses the previously applied colour mark either optically or by the magnetic or electric properties of the marking ink and a second, photoelectric, system monitors the centring of the printing. Imperfect banknotes are discarded prior to priming with serial numbers or if already printed are replaced by perfect ones. Further counting takes place before final packaging. Correct centring is determined by measuring the width of the plain border surrounding the printing at two specific points along one edge and at one point along an adjacent edge. In one arrangement the banknote must be correctly aligned on the conveyor or rollers with respect to the detecting apparatus and is arranged with its longer edge transverse to the direction of motion. Two light beams are directed onto the conveyer at spaced points across the path of the note and with associated electronic multipliers receiving reflected light time the passage of the border along the longer edge as it goes by and so provide a measure of its width at the two points. The width of the border along the adjacent edge, which extends parallel to the direction of motion, is measured by an oscillating photo-electric device scanning the border and whose readings are taken at a certain time after the leading edge of the bank-note has been detected. The electrical signals representing the widths are compared with standard electrical signals to determine whether the note is acceptable.

A method used in the art to compare printed images with a reference image is called pattern matching. In this method, one determines a reference pattern in a reference image, then one looks for said predetermined reference pattern in a sample image of the print being inspected, whereby all possible position variations of the reference pattern within a search area of the inspected print are compared for a match. This implies both that (i) the reference pattern must be sufficiently unique to be robustly identified in the sample image and that (ii) the search area must be sufficiently larger than the reference pattern to be able to find all expected position variations of the reference pattern. An example of a prior art publication related to this field is "Digital Image Processing", Gonzalez/Woods, Addison Wesley, page 583 (ISBN 0-201-50803-6).

More specifically, to carry out pattern matching, known methods can be used. This process involves mainly two phases: an off-line learning phase in which the template is processed, and a matching phase that can be executed in real time. The learning phase of pattern matching involves analysing the template image to find features that can be exploited for efficient matching performance. The matching phase uses the information from the learning phase to eliminate as much unnecessary calculation as possible.

Typically, the matching algorithm that can be used depends on whether the user has specified shift-invariant matching (finding the template at any location in the search image) or rotation-invariant matching (finding the template at any location AND rotation in the search image). Both are two-pass processes.

Shift-Invariant Matching

The first pass is a correlation that uses only the pseudo-randomly sampled pixels from the template image. The results of the stability analysis are used to determine how many positions in the search image can be skipped without missing any important features. For example, if all the sub-sampled pixels were found to be stable in a 3×3 neighborhood, the matching algorithm can skip two out of three correlations in each row and column while still guaranteeing that a match will be detected. This reduces the number of calculations required by a factor of 9. The first pass produces a number of candidate matches with rough position information.

The second pass only operates on the candidates identified in the first pass. The edge detection results of the learning phase are used to fine-tune the location of each match, and a score is produced for each based on the correlation result at that location. A user-provided score threshold determines which candidates are returned as matches.

Rotation-Invariant Matching

The first pass uses the circular intensity profile from the learning phase to search for shifted versions of that profile throughout the image. The user can input an allowable rotation range (in degrees) to reduce the number of calculations required in this pass. Several candidate matches are identified in this pass.

The second pass uses the pseudo-randomly sampled pixels to perform a correlation with all the candidates. A score is produced for each candidate to determine whether it should be classified as a match or not.

The choice of the template to be matched can have a great impact on the speed and accuracy of the pattern matching algorithm. There are some general observations:

- The template should be asymmetric enough so that it can be uniquely identified at a certain orientation.
- Complex templates will take longer to match than very simple ones. However, it must be ensured ensure that the template includes enough detail to uniquely identify and precisely localize the pattern.
- The template should contain enough detail to fix its spatial position in the image. To do this, it needs to contain both vertical and horizontal features.
- If one tries to locate a simple feature such as a dot or hole in a board, the template should be large enough to contain background information that distinguishes that particular feature from similar ones in the image.

US patent application No. 2003/0194136 A1 discloses an example of a known pattern matching technique and an image processing device to carry out the said technique. This device is adapted to detect and extract a pattern which resembles a specified pattern within image data which is obtained from a sample printed document and to calculate the degree of resemblance between the extracted pattern and a reference pattern which was established beforehand. The disclosed device is in particular intended to be used is a colour-copy machine in order to detect paper money when someone attempts to copy it and prevent the copying process from proceeding to completion. According to this application, the whole surface of the sample printed document is accessible to the image acquisition device. According to US 2003/0194136 A1, detection of a specified pattern in the image data is carried out using masks of specified sizes and checking areas of the image for patterns which are possible matches with each specified pattern which is to be detected, e.g. a mark, figure, etc. If a possible candidate is detected, a reference position of the pattern is specified and the data is transmitted for further processing to extract the specified pattern and match this pattern with a reference pattern defined beforehand.

The solution described in US 2003/0194136 A1 might be adapted to application environments where the whole surface of the sample printed documents to be tested is available for inspection. Such solution is however inadequate for applications where only a limited portion of the surface of the printed documents is available for detection.

A similar approach and device is discussed in European patent application EP 0 382 549 A2. In this case also, the whole surface of the sample printed document (e.g. a banknote) is available for inspection. This solution is accordingly also unsuited for applications where only a limited portion of the surface of the printed documents is available for inspection.

Another field linked to the production of banknotes and similar products involves the counting of the products. Typically, in the field of banknotes, one produces a certain number of individual notes which are stacked in the form of bundles and packs after cutting of sheets into the individual notes, and it is important to count the notes present in each pile to control that the each bundle and pack comprises a predetermined number of notes.

A well-known counting device is disclosed in EP 0 737 936, the content of which is incorporated by reference in the present application. This device includes a counting disc for counting sheet-like substrates arranged in a stack, such as stacks of sheets or notes. More specifically, the counting disc comprises circumferential sections arranged on its border, and each circumferential section has a suction hollow in which suction openings located one behind the other are arranged. Upon rotation of the counting disc, said suction openings are connected intermittently to a suction-air source, with the result that the corners of a stack (for example a stack of banknotes), one after the other, are subjected to suction, deformed, separated from the rest of the substrates and, by virtue of a pneumatic counting pulse being produced, counted. The suction air is supplied to the suction openings via a duct whose section, which opens into the suction openings, is directed perpendicularly with respect to the plane of the counting disc. In the end, the number of pulses produced corresponds to the number of sheet-like substrates counted.

An evolution of this counting device is disclosed in International application WO 01/14111, the content of which is incorporated by reference in the present application. In this evolution, in addition to counting the piled substrates with a rotating disc based on the technology of EP 0 737 936, said disc comprises additional means to determine the location of printed patterns on the counted substrates to carry out a check comparable to the one disclosed in U.S. Pat. No. 3,412,993 cited above, i.e. for controlling the so-called print-to-cut register. The idea of International application WO 01/14111 is to provide means on the counting device that allow simultaneous control of the distance between an edge of the counted substrate and the printed images on said substrate, during the counting operation. Indeed, it is important to ensure that after the cutting operation a predetermined distance between the edges of the resulting substrate and the printed patterns thereon remains constant or at least within certain predetermined limits. The optical system disclosed in International application WO 01/14111 allows determination during the counting operation of said distance with respect to two edges of the substrate by a reflection measurement.

This combination of two operations (counting and distance measurement) is an advantage since it allows to reduce the time necessary to produce substrates meeting the desired quality requirements.

As mentioned above, it is sometimes important to measure the position of a print on paper relatively to the edges of the paper or between two different print processes. One example is the measurement of the position of the paper cut to the print on banknotes during the production process (the so-called print-to-cut or print-to-edge register). Normally, as in the prior art, one looks for an unique pattern in the acquired image to have an accurate measurement of the print position itself.

As already mentioned hereinabove, a condition to be met is the fact that the search area has to be larger than the search pattern to be found to cover all expected position variations.

Due to the limited available space in some machine environments it is sometimes only possible to have access to a very small viewing area of the print or paper sheet. Consequently, if one can see only a small part of the print and the variation in the normal printing process is larger than the size of the viewing area, the selected reference or search pattern can vary in its position in such a way that it may disappear from the viewing area. In this case it is not possible to use a common pattern matching method as discussed above (such as discussed in US 2003/0194136 A1 and EP 0 382 549) where the reference or search pattern is selected within a reference image, as taught by the prior art methods, and it is necessary to find a new approach. This problem is typically present in the device of International application WO 01/14111, but such problem also arises in other applications where only a small part of the print to be inspected can be viewed.

SUMMARY OF THE INVENTION

An aim of the invention is to improve the known methods and devices.

In particular, an aim of the present invention is to provide a method that overcomes the limitation of the known methods, i.e. a method that is suitable for application in an environment where only part of the surface of the printed documents is available for inspection.

These aims are achieved thanks to the method defined in the claims.

More specifically, the inventive concept of the present invention can be summarized as follows: rather than using a predetermined reference pattern and looking for this pattern in the sample image acquired from the print being controlled, the reference pattern, or more precisely the search pattern, is actually derived from the sample image itself, it being understood that this search pattern will be different for each sample image.

A reference image of a print considered to be meeting the quality requirements, or an image defined as the reference image, having a size that is greater than the sample image is defined and stored, preferably by acquiring such a reference image using an optical acquisition system that is distinct from the acquisition system used for taking the sample image. Typically, the reference image can be acquired using a scanner or another similar acquisition system. Important is that the image acquired by this system is larger that the sample image to cover all possible variations of the search pattern.

In an alternate embodiment, the reference image could be built by assembling several sample images to form the reference image. This would imply a learning process during which the reference is built, and also that the sample images are different.

Then, the search pattern is correlated with the reference image in order to find a match and thus determine the location of the search pattern in the reference image. In addition, the position of the search pattern in the sample image is determined and so is the position of the match in the reference image. Both positions are then compared and the system may then decide whether the values for the sample image meet the established criteria (for example are within predetermined ranges) to accept or reject the inspected document.

A typical and preferred application of this method is in the system disclosed in International application WO 01/14111 for carrying out print-to-cut register control. Of course, other applications may be envisaged, such as for carrying out print-to-print register control.

It will be readily understood that the method according to the present application can be extended to any application where the acquired sample image is small with respect to the reference image.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

The invention will be described in the following in the context of the control of the so-called "print-to-cut register" (or "print-to-edge register") of banknotes, i.e. control of the position of the imprints on the banknotes with respect to the cut edges of the banknotes. More precisely, the invention will be described in the context of a control system which performs print-to-cut register control of the banknotes while simultaneously performing counting of the number of such banknotes within a pile or bundle of banknotes (one bundle typically comprising hundred banknotes), which control system is known as such from International application WO 01/14111 which is incorporated herein by reference in its entirety. It shall however be appreciated that the present invention has a wider scope of application and is not as such limited to print-to-cut register control of banknotes. First of all, the present invention can also be applied to print-to-print register control, i.e. control of the relative positions of imprints printed during distinct printing phases. Moreover, the present invention is not limited to the quality control of banknotes but can be applied to quality control of other security documents, such as passports, ID cards, etc., or even printed documents at large.

Figure 1:
FIG. 1 is a schematic view of a printed document on which the process of the invention is applied.

FIG. 1 shows an image of a specimen of a printed banknote 1 bearing the effigy of "Jules Verne" (referred to as the "Jules Verne specimen"). In this embodiment, quality control of the print-to-cut register is performed at one corner of the banknote 1, i.e. the upper right corner in FIG. 1 which is designated by reference numeral 2. Two parallel curved lines 3, 4 are schematically illustrated in FIG. 1 on corner 2 of the banknote 1. These parallel curved lines 3, 4 schematically indicate the travel path of a small optical sensing device (not illustrated) which is passed over the surface of corner 2 during counting of a plurality of piled banknotes 1 by means of the counting disc with integrated optical system described in WO 01/14111. This example is again not limiting and is only given for the purpose of illustration.

Figure 2:
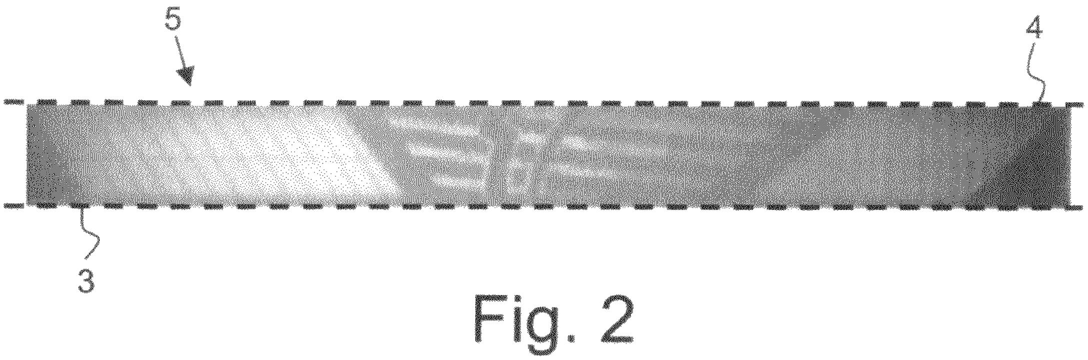
FIG. 2 is an example of a sample image acquired from a small strip of the surface of the printed document of FIG. 1.

One will appreciate that the optical sensing system only acquires an image (hereinafter referred to as a "sample image") of a limited portion of the sample printed document, i.e. the area of the corner 2 of the banknote 1 between the curved lines 3, 4. An example of the resulting sample image, designated by reference numeral 5, is shown in FIG. 2. One will understand that, in the presently described context where a plurality of piled banknotes are counted by means of a counting disc, the acquired sample image 5 will change from one banknote to the next, especially in terms of position, and possibly orientation. More precisely, the actual position of the travel path of the optical system with respect to the corner 2 of each banknote 1 (as indicated by curved lines 3, 4) changes from one processed banknote to the next due to the fact that the corner of each processed banknote cooperates in a slightly different manner with the counting disc.

In this embodiment, the acquired sample image 5 covers only a small strip of the banknote 1 between lines 3, 4, the height of the image being of the order of a few millimeters only (e.g. 1.4 mm, 36 pixels). In this context, the strip is so small that another sample image 5 taken by the same acquisition system may cover a completely different region of the corner 2 of the banknote 1 and may therefore include completely different pixel information. Furthermore, one will understand that a deviation in print or cut position of more than the height of the acquired sample image 5 between two inspected banknotes would lead to entirely different sample images 5. As mentioned in the preamble, it is therefore impossible to apply the prior art pattern matching methods whereby a predetermined reference pattern is selected in a reference image for matching with the acquired sample image as this reference pattern may not at all be visible in the sample images. A new approach is needed, which approach will be described in the following.

Figure 3:
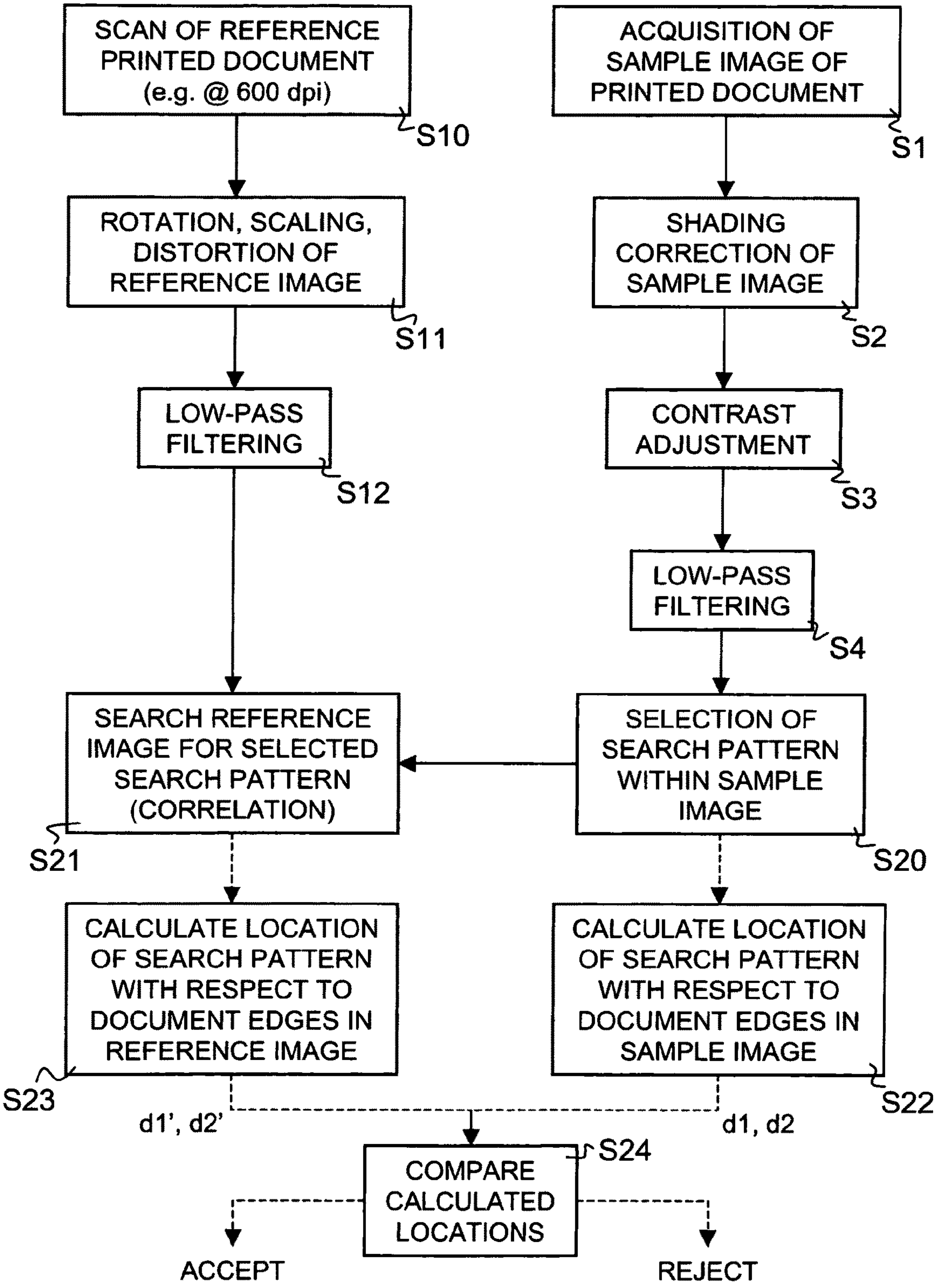
FIG. 3 is a flow chart of an embodiment of the method according to the invention.

FIG. 3 is a schematic flow chart illustrating an embodiment of the control method according to the invention. At step S1, the sample image 5 (i.e. an image of local region of the inspected document) is taken by the optical acquisition system. In this embodiment, the sample image 5 is optionally pre-processed at steps S2, S3 and S4. More precisely, these pre-processing steps include correction of the shading effect that is present in the sample image 5 at step S2 (which shading effect is apparent in the outer areas of the sample image shown in FIG. 2), adjustment of the contrast of the sample image 5 at step S3 (the contrast being not optimal in the sample image as also apparent in the sample image shown in FIG. 2) and low pass filtering at step S4 in order to filter the noise in the sample image 5 (in particular the quantum noise present in the image due to non-optimal lighting conditions during image acquisition).

In parallel to steps S1 to S4, a reference image is stored at step S10. This reference image is preferably a scanned image of at least a portion of a reference printed document (i.e. a printed document meeting the desired quality requirements). In the present embodiment, the reference image covers the corner 2 of the banknote 1 where the inspection (and counting) is carried out. The reference image can be scanned using a flat-bed scanner at a sufficiently high resolution, for instance of 600 dpi. The reference image also undergoes pre-processing steps S11 and S12 in order to adjust its parameters to the sample image 5 that is acquired. More precisely, since the sample image 5 is distorted by the acquisition process (i.e. due to the curved path followed by the optical acquisition system), the reference image is rotated, scaled and distorted at step S11 so as to have substantially the same orientation, scale and distortion as the acquired sample image (as shown in the upper part of FIG. 4 where reference numeral 6 designates the pre-processed reference image). Further, the rotated, scaled and distorted reference image is similarly low-pass filtered at step S12 in order to remove noise resulting from the scanning process.

One will appreciate that the purpose of pre-processing steps S2 to S4, S11 and S12 is to ensure the best possible match between the reference image 6 and the sample image 5, i.e. so that so that both images have substantially the same shading, contrast, orientation, scale, distortion and/or noise level. Other pre-processing steps are of course possible depending on the situation and the conditions in which the sample image is acquired and the reference image is defined.

Figure 4:
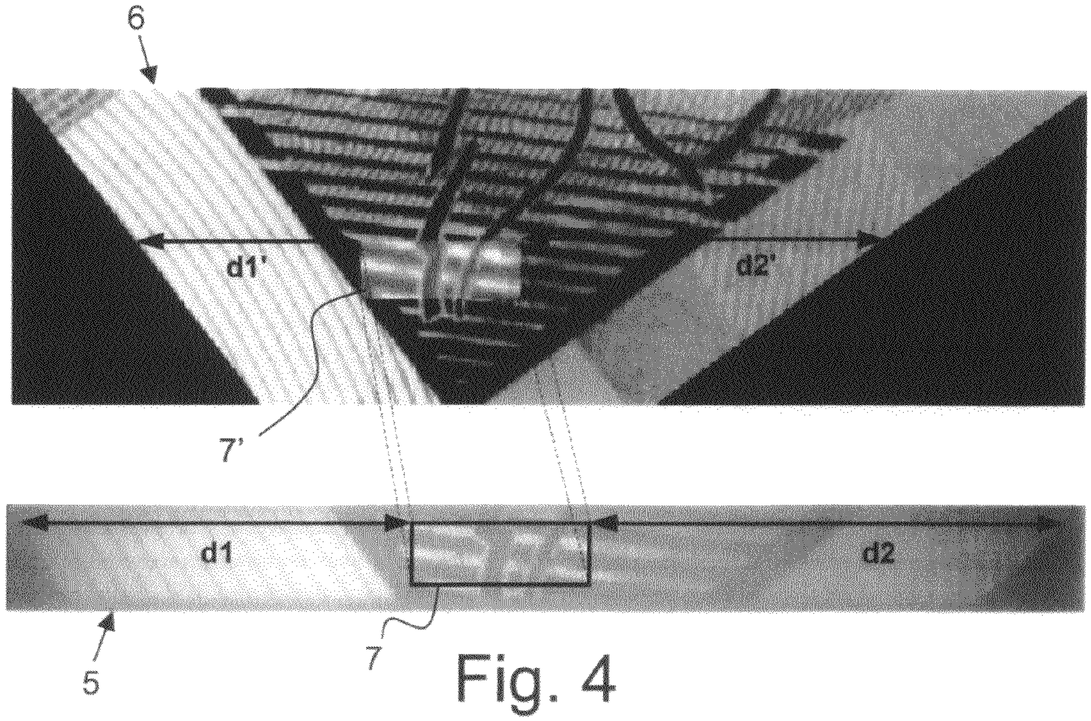
FIG. 4 is an exemplary illustration of the result of the pattern matching method of FIG. 3 for carrying out print-to-cut register control.

At step S20, a search pattern is defined and selected within the acquired and optionally pre-processed sample image. FIG. 4 shows this search pattern 7 selected in the sample image 5. This search pattern 7 can be a predetermined region of the sample image 5, i.e. a region which has a determined location and size within the sample image 5. The location and size of the search pattern 7 shall be selected with regard to different factors including in particular the available size of the sample image, the patterns actually printed on the document (which patterns must be sufficiently unique to allow pattern recognition) and the pattern matching algorithm per se. In the present example, it suffices for instance to select a search pattern of a suitable pixel size (for example of 32×128 pixels) located substantially in the center of the sample image where characterizing patterns of the banknote are located (in this example, portions of the Pegasus printed in the corner 2 of the banknote 1) in order to yield a sufficiently robust pattern matching with the reference image. In an alternate embodiment, the search pattern could be selected as being the whole sample image.

It shall be appreciated that, while the location and size of the search pattern 7 can be predetermined, the actual pixel content of the search pattern will actually change from one sample image to the next in dependence of the area covered by the optical acquisition system. In other words, the content of the search pattern 7 is constantly changing from one sample image to the other.

Once the search pattern 7 has been selected within the sample image 5, the reference image 6 is searched for a match with the search pattern 7. This can be performed according to known pattern matching algorithms, for instance by performing a so-called cross-correlation of the reference image 6 with the selected search pattern 7 (see for instance B. Jahne, *Digital Image Processing*, Springer, New York, 2002). In practice, this implies a processing whereby all possible areas within the reference image 6 having the size of the selected search pattern 7 are compared for a match with the search pattern 7. The result of such correlation is the identification of the location (x- any y-positions) of the area within the reference image 6 the content of which best corresponds to the selected search pattern 7. This area is schematically illustrated in the upper part of FIG. 4 as a light grey area designated by reference numeral 7'.

Figure 5:
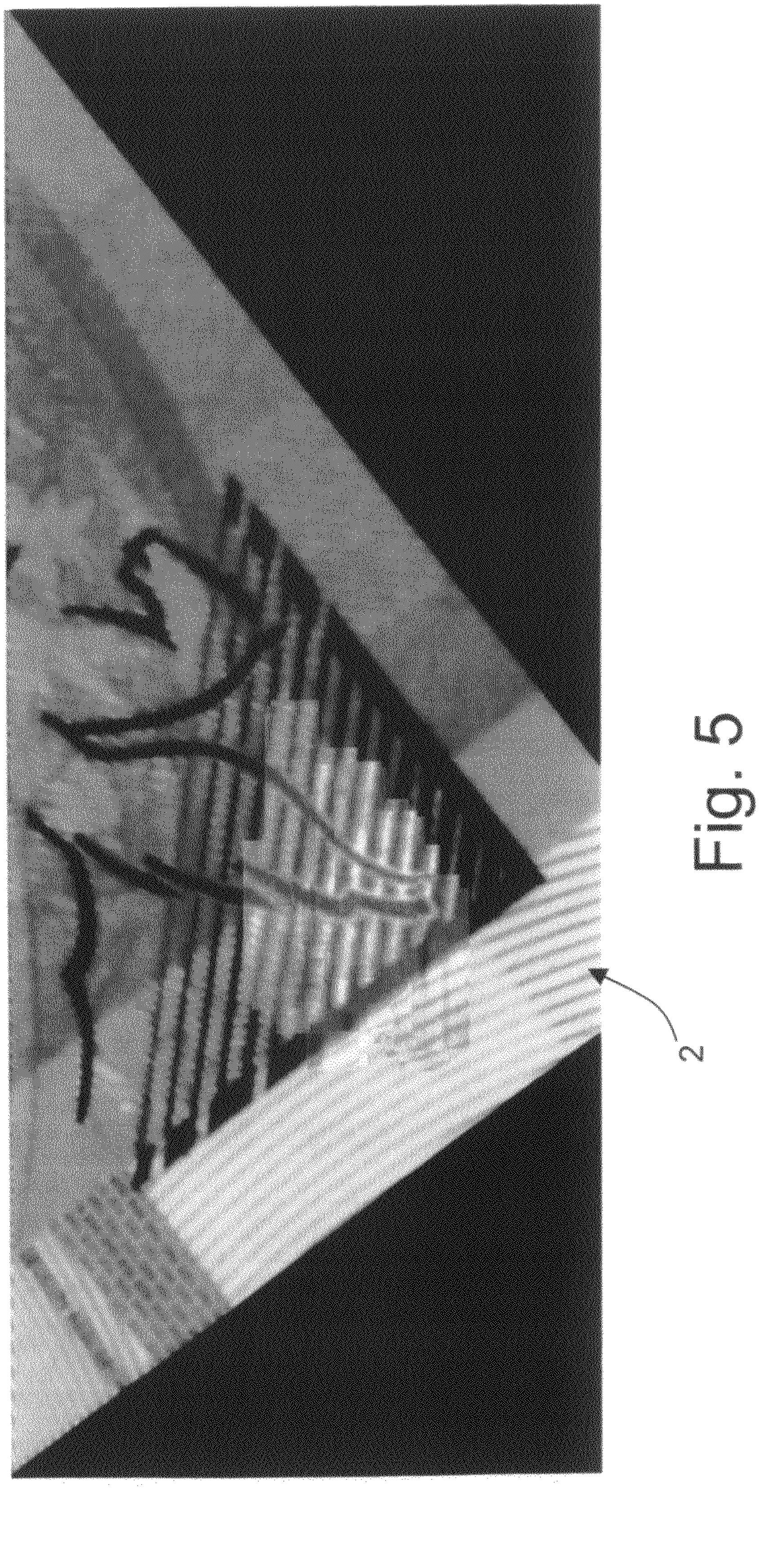
FIG. 5 is a schematic illustration of possible variations of the position of the search pattern within the reference image.

For the purpose of illustration, FIG. 5 shows possible variations (as light grey areas) of the location of the search pattern within the reference image 6. As already mentioned, these variations are the result of the constantly changing position of the acquired sample image from one inspected banknote to the next. Within the scope of the present invention, and in contrast to prior art matching techniques, one may appreciate that the search pattern does not have a fixed definition but rather that it is variable. Nevertheless, thanks to the above-described approach, pattern matching can be performed with success.

In the context of print-to-cut register control, one is interested in verifying that the printed patterns are appropriately positioned with respect to the edge of the document, or conversely, that the cut edge is appropriately positioned with respect to the printed patterns. In the present embodiment, the print-to-cut register can be checked by measuring and comparing the actual position of the search pattern 7 with respect to the edges of the printed document in the sample image 5 and the position of the search pattern 7' with respect to the edges of the printed document in the reference image 6 at steps S22, S23 and S24. To this end, the edges of the printed document are detected in the sample image 5 and in the reference image 6. Such edge detection can be performed in a relatively simple manner as the edges of the document can be clearly differentiated from the darker background in both the sample and reference images. Then the location of the search pattern with respect to the document edges in the sample image 5 and in the reference image 6 can be determined. Distances d1 and d2 in FIG. 4 indicate the location of the search pattern 7 with respect to the edges of the document within the sample image 5. Similarly, distance d1' and d2' in FIG. 4 indicate the corresponding location of the search pattern 7' with respect to the edges of the document within the reference image 6. As the image of the corner 2 of the banknote is taken obliquely with respect to the edges of the document, distances d1, d2 and d1', d2' are sufficient in order to unequivocally determine the exact position of the seach pattern with respect to the edges of documents. In other implementations, further information about the location of the search pattern within the sample and reference images might be necessary. Referring again to the flow chart of FIG. 3, steps S22 and S23 respectively designate the steps whereby the location of the search pattern with respect to the document edges in the sample image and in the reference image is determined, and step S24 designates an ultimate step whereby the location of the search pattern within the sample image 5 is compared to that of the search pattern within the reference image 6. If these locations match within a determined tolerance range, the print-to-cut register is considered to be adequate. Otherwise, a fault is communicated to the operator so that appropriate corrective measures can be taken.

It shall be appreciated that steps S22 to S24 in FIG. 3 are as such optional as far as the pattern matching technique is concerned, this being depicted by dashed lines in FIG. 3.

In the context of print-to-print register control, one would be interested in verifying that a first printed pattern printed during a first printing phase (for instance an offset pattern) is appropriately positioned with respect to a second printed pattern printed during a second printing phase (for instance an intaglio pattern printed). In this case, provided both printed patterns are visible in the sample image, the relative position of these patterns might be determined and controlled in a manner similar to that described above.

Let us turn back to the above-described embodiment wherein print-to-cut register control is carried out simultaneously to a counting operation. It shall be appreciated that the time available for carrying out inspection is limited. Banknote bundles typically comprise hundred banknotes stacked one above the other. Furthermore, packs of ten bundles (i.e. thousand banknotes) are usually formed. It takes approximately five seconds for performing the counting operation on a pack of thousand banknotes, i.e. five milliseconds per banknote which is the available time frame for carrying out the print-to-cut register control of each banknote within the pack.

Considering the above constraints, the pattern matching algorithm is preferably implemented using a so-called fuzzy pattern classifier which is not directly applied on the pixel information of the images, but rather on a spectral transform of the pixel information as for instance taught in the publication of Messrs. Volker Lohweg, Carsten Diederichs, and Dietmar Müller, "*Algorithms for Hardware-Based Pattern Recognition*" EURASIP Journal on Applied Signal Processing, vol. 2004, no. 12, pp. 1912-1920, 2004.

In this context, various transform might be envisaged to carry out conversion to the spectral domain. Different non-sinusoid transforms can for instance be applied in order to serve as pattern generator for the fuzzy pattern classifier, including so-called Generalized Circular Transforms (or GCT) which have some properties which are useful for the analysis of transient and periodic signals (see for instance the publication of Messrs. Volker Lohweg and Carsten Diederichs, "*An Image-Processing-System-On-Chip Based on Nonlinear Generalized Circular Transform and Fuzzy Pattern Classification*", IEEE-EURASIP Workshop on Nonlinear Signal and Image Processing, Grado-Trieste, Italy, June 2003). Among the family of GCT transforms, Square Wave Transform (SWT), Generalized Circular Transform A1 (GCTA1) and Generalized Circular Transform p2 (GCTp2) are of particular interest.

In addition to the GCT transform, the so-called Walsh-Hadamard transform (WHT) could also be applied (see for instance the publication of Messrs. N. Ahmed, K. R. Rao and A. L. A. L. Abdussattar, "*BIFORE or Hadamard Transform*", IEEE Transactions on Audio and Electroacoustic, vol. AU-19, pp. 225-234, 1971). This WHT transform is sometimes called BIFORE transform (Binary FOurier REpresentation).

Other types of transform could be envisaged such as the conventional Fast Fourier Transforms (FFT).

Fuzzy pattern classification (FPC) is a very useful approach for modelling complex systems and classifying data (see for instance the publication of Messrs. S. F. Bocklisch and U. Priber, "*A Parametric Fuzzy Pattern Classification Concept*", Proceedings of the International Workshop on Fuzzy Sets Applications, pp. 147-156, Mar. 3-8, 1985, Eisenach, Akademie-Verlag, Berlin, Germany, 1986). This approach was in particular used for banknote inspection because of better classification results compared to other classifiers (see publication of Messrs. Thomas Türke and Volker Lohweg, "*Real-Time Image-Processing-System-On-Chip For Security Feature Detection and Classification*", Proceedings of IS&T/SPIE 16$^{th}$ Annual Symposium on Electronic Imaging, Vol. 5297, pp. 204-211, San Jose, Calif., USA, January 2004).

From the point of view of the hardware implementation, the transform (which constitutes the major part of the computation time—approx. 90%) can advantageously be implemented on one Field Programmable Gate Array (or FPGA) such as of the type ALTERA Stratix (Altera, Digital Library of FPGA's, San Jose, January 2006, www.altera.com) with a clock rate of 50 MHz.

It will be understood that various modifications and/or improvements obvious to the person skilled in the art can be made to the embodiments described hereinabove without departing from the scope of the invention defined by the annexed claims.

Indeed, it is clear that the present invention may be used in any application in which one can acquire an image of only a small portion of the printed document to be inspected.

In addition, according to an alternate embodiment, pattern matching might be performed on a plurality of search patterns rather than on only one.

The invention claimed is:

1. A method for controlling the quality of printed documents, such as banknotes and other similar documents, in an environment where only part of the surface of the printed documents is available for inspection, the method comprising the following steps:

storing a reference image that is a scanned image of at least a portion of a reference printed document meeting desired quality requirements, acquiring a sample image of a sample printed document to be controlled, which sample image covers only a limited portion of the sample printed document, selecting a search pattern within the acquired sample image, searching the reference image for a match pattern corresponding to the selected search pattern, determining quality control parameters linked to the position of the search pattern within the sample image and quality control parameters linked to the position of the match pattern within the reference image, comparing the quality control parameters linked to the position of the search pattern within the sample image with the quality control parameters linked to the position of the match pattern within the reference image, based on the results of the comparison of the control parameters, accepting or rejecting the sample printed document.

2. The method as defined in claim 1, wherein searching the reference image for the match pattern corresponding to the selected search pattern uses a pattern matching algorithm.

3. The method as defined in claim 2, wherein the pattern matching algorithm includes cross-correlating the reference image with the sample image.

4. The method according to claim 2, wherein the pattern matching algorithm is based on fuzzy pattern classification (FPC).

5. The method according to claim 4, wherein the fuzzy pattern classification (FPC) is carried out on a spectral transform of pixel information from the sample and reference images.

6. The method as defined in claim 1, further comprising the step of pre-processing the reference image and/or sample image.

7. The method as defined in claim 6, wherein the step of pre-processing includes shading correction, contrast adjustment, rotation, scaling, distortion and/or filtering of the reference image and/or sample image so that both images have substantially the same shading, contrast, orientation, scale, distortion and/or noise level.

8. The method as defined in claim 1, wherein the quality control parameters include at least a distance between an edge of the printed document and a position of the search pattern within the sample and reference images.

9. The method as defined in claim 8, and further comprising the step of controlling the print-to-cut register of the printed documents.

10. The method as defined in claim 9, carried out while performing counting of the number of printed documents within a pack or bundle of stacked printed documents.

11. The method as defined in claim 1, wherein the quality control parameters include at least a distance between two printed patterns printed during distinct printing phases of the production process of the printed documents.

12. The method as defined in claim 1, including selecting a plurality of search patterns within the sample image and searching the reference image for a plurality of match patterns corresponding to the plurality of search patterns.

13. An inspection system for carrying out the method according to claim 1, wherein pattern matching is carried out based on a spectral transform of pixel information from the sample and reference images and wherein the spectral transform is hardware-implemented on one Field Programmable Gate Array (FPGA).

14. A method for controlling the quality of printed documents, such as banknotes and other similar documents, in an environment where only part of the surface of the printed documents is available for inspection, the method comprising the following steps:

storing a reference image that is an image built by assembling several sample images to form the reference from several printed documents meeting desired quality requirements, acquiring a sample image of a sample printed document to be controlled, which sample image covers only a limited portion of the sample printed document, selecting a search pattern within the acquired sample image, searching the reference image for a match pattern corresponding to the selected search pattern, determining quality control parameters linked to the position of the search pattern within the sample image and quality control parameters linked to the position of the match pattern within the reference image, comparing the quality control parameters linked to the position of the search pattern within the sample image with the quality control parameters linked to the position of the match pattern within the reference image, based on the results of the comparison of the control parameters, accepting or rejecting the sample printed document.

* * * * *